Sept. 12, 1944.  G. DEN BESTEN  2,358,216
SAFETY RELEASE HITCH
Filed Dec. 4, 1941  2 Sheets-Sheet 1

Inventor
Gerrit Den Besten
By Liverance and Van Antwerp
Attorneys

Sept. 12, 1944.　　　　G. DEN BESTEN　　　　2,358,216
SAFETY RELEASE HITCH
Filed Dec. 4, 1941　　　2 Sheets-Sheet 2
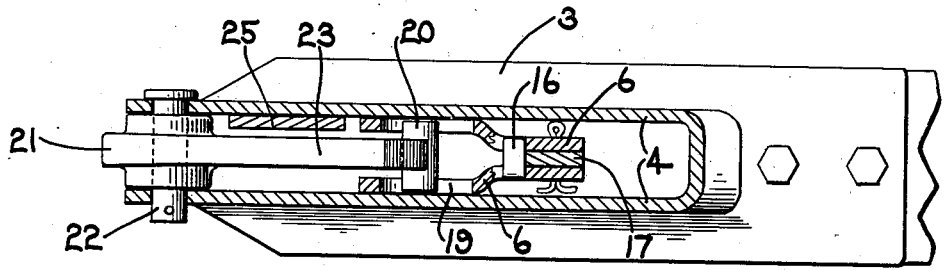
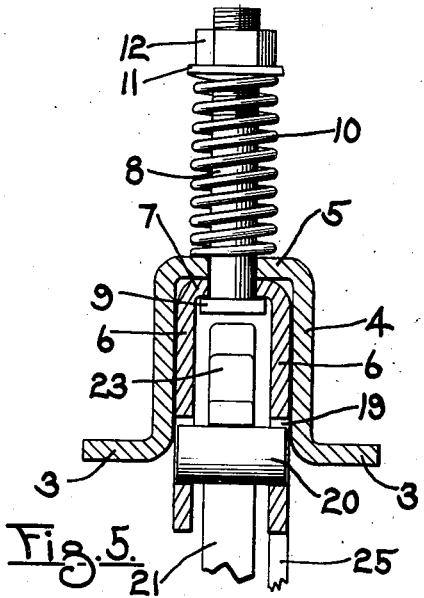
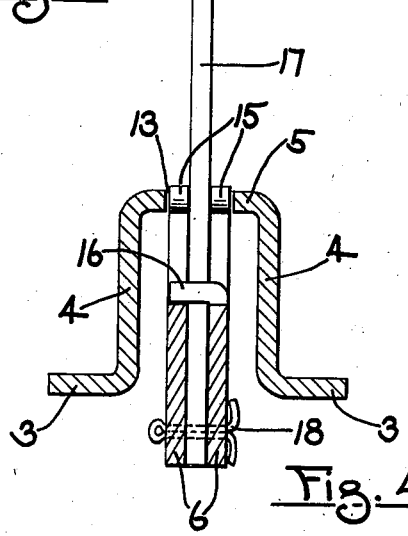
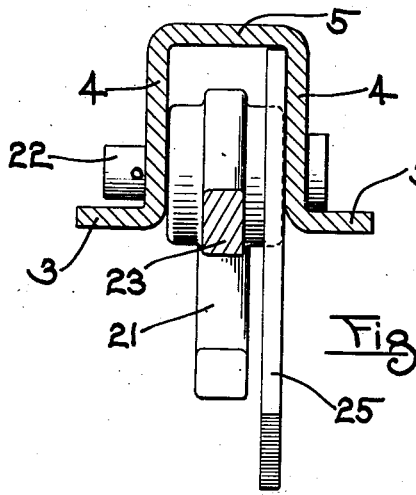
Inventor
Gerrit Den Besten
By Liverance and
Van Antwerp
Attorneys Patented Sept. 12, 1944

2,358,216

UNITED STATES PATENT OFFICE 2,358,216

SAFETY RELEASE HITCH

Gerrit Den Besten, Pella, Iowa

Application December 4, 1941, Serial No. 421,603

11 Claims. (Cl. 280—33.16)

This invention relates to a safety release hitch which is adapted to be secured to an implement and be releasably connected to the clevis of a tractor whereby the implement may be drawn.

One of the objects of the invention is to provide a structure formed of cast parts sufficiently few in number so as to facilitate assembly thereof.

Another object of the invention is the provision of a rotatable hook adapted to be connected to the tractor clevis and remain in connected position under normal load conditions, but be released from the clevis under abnormal load.

A still further object of the invention is the provision of a freely movable or floating pin against which the tail-piece of the hook bears under normal load to thereby hold the hook in engaged position, but which is movable out of the path of the tail-piece under abnormal load to thereby break the connection between the hitch and the tractor.

Still another object of the invention is the provision of a support for the floating pin which support is yieldably held in normal position but which may be moved under abnormal load conditions to release the connection between the hitch and tractor.

Other objects and purposes of the invention will appear more fully as the description proceeds.

To the accomplishment of the foregoing and related ends said invention, then, consists of the means hereinafter fully described and particularly pointed out in the claims.

The annexed drawings and following description set forth in detail certain means for carrying out my invention, said means constituting, however, but one of various ways in which the principle of the invention may be employed.

In said annexed drawings wherein like reference numerals refer to like parts throughout the various views:

Fig. 3 is a horizontal section taken along the plane of line 3—3 in Fig. 1.

Fig. 4 is a somewhat enlarged vertical section taken on the plane of line 4—4 of Fig. 1.

Fig. 5 is a vertical section taken along the plane of line 5—5 of Fig. 1, and

Fig. 6 is a vertical section taken along the plane of line 6—6 of Fig. 1.

Figure 1:
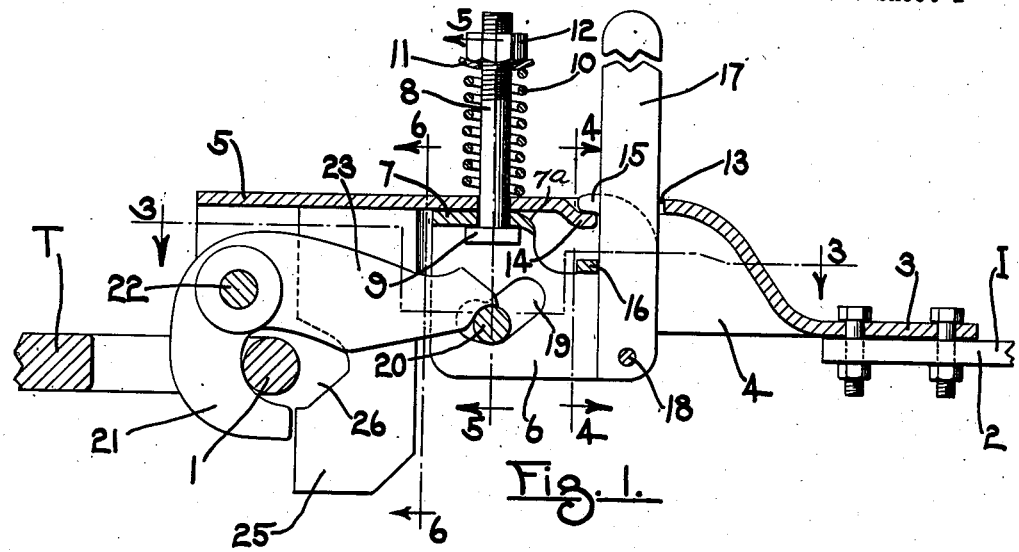
Fig. 1 is a longitudinal vertical section through the hitch showing various parts thereof in elevation and showing the hook member in engaged position.

Referring now more particularly to the drawings the clevis of the tractor is indicated at 1 and a portion of the implement to which the hitch is secured is indicated at 2. The hitch itself comprises a housing which includes a base or flanged portion 3, upwardly extending spaced apart sides 4 and a connecting web or covering 5 at the upper side thereof.

Within the housing a support is located which has spaced apart sides 6 which are offset near their rear edges toward each other so they are closer together at the rear than at the front. A connecting web 7 connects the upper edges of the sides 6 at their forward portions.

The web 5 of the housing and the web 7 of the support are provided with alined openings for the purpose of receiving an upwardly extending rod 8 having a head 9 at its lower end bearing against the under side of the web 7. A coiled compression spring 10 surrounds the rod 8 and has a washer 11 located at its upper end against which a nut 12 bears by threadedly engaging the upper end of the rod 8. The spring 10 thus yieldably holds the support in place against the under side of the housing web 5 and the force which is necessary to move the support against the force of the spring will be adjusted by tightening or loosening the nut 12.

Figure 7:
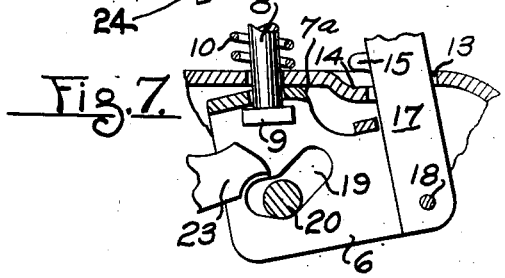
Fig. 7 is a fragmentary vertical section showing the support moved to manually unlatching position.

Rearwardly of the rod 8 the web 5 of the housing is provided with a slot or opening 13. At the forward edge of the opening the web 5 is bent downwardly and rearwardly as at 14, and the rear end of each of the spaced apart sides 6 of the support extend upwardly and are curved forwardly as at 15 to thereby bear against the rearwardly extending lip 14. It will be evident from viewing Figs. 1 and 2 that the sides of the support are recessed between the forward and rearward ends thereof and one of the sides is provided with an extension 16 which is bent to horizontal position and extends across the space between the sides as more clearly shown in Fig. 3. A lever arm 17 is located between the spaced apart rear ends of the sides 6, is pivotally mounted thereon at 18 and will come against the extension 16 as a stop when moved forwardly. By this construction it will be noted that the support is provided with two fulcrums, the one where the extensions 15 hook over the lip 14 which is located some distance from the spring urged bolt 8 and the other the web 7, the forward edge of which is rounded at 7a so that the support may rock more freely on that fulcrum which is located very close to said bolt 8. Movement of the lever 17 will rock the support on the fulcrum 7a as shown in Fig. 7 but because this fulcrum is located very close to the spring urged bolt 8 the resistance to this movement by the spring 10 is very slight.

Substantially L-shaped slots 19 are located in each of the sides 6 of the support, and extending between these sides is a pin 20 having its ends located in the slots which ends are of a smaller diameter than the widths of the slots so that the pin may be freely movable longitudinally thereof. The slots are positioned substantially as shown in Figs. 1 and 2 so that the normal position of the pin 20 will be at the juncture of the two arms of the slot.

At the forward end of the housing a hook 21 is pivotally mounted to rotate about the pivot pin 22, and extending rearwardly from this pivot pin the hook is provided with a tailpiece 23 which is arcuately curved at the under side of its rear end as at 24, the radius of curvature of such arcuate portion being substantially the same as that of the pin 20 whereby the tail-piece will bear against the pin 20 in its normal engaged position.

It will be evident from the foregoing that when the hook is in engaged position with the clevis and a pull is exerted thereagainst, the tail-piece 23 will bear downwardly against the pin 20 under normal load conditions. When an abnormal load is reached which is sufficient to overcome the force of the spring 10, the rear end of the tail-piece 23 will move downwardly thereby urging the support to rotate about its pivotal point on the lip 14 in a counter-clockwise direction. The pin 20 will also move downwardly with the support until it has been moved completely out of the path of the tail-piece 23 whereupon the pulling force of the clevis will move the hook to its disengaged position shown in Fig. 2.

Figure 2:
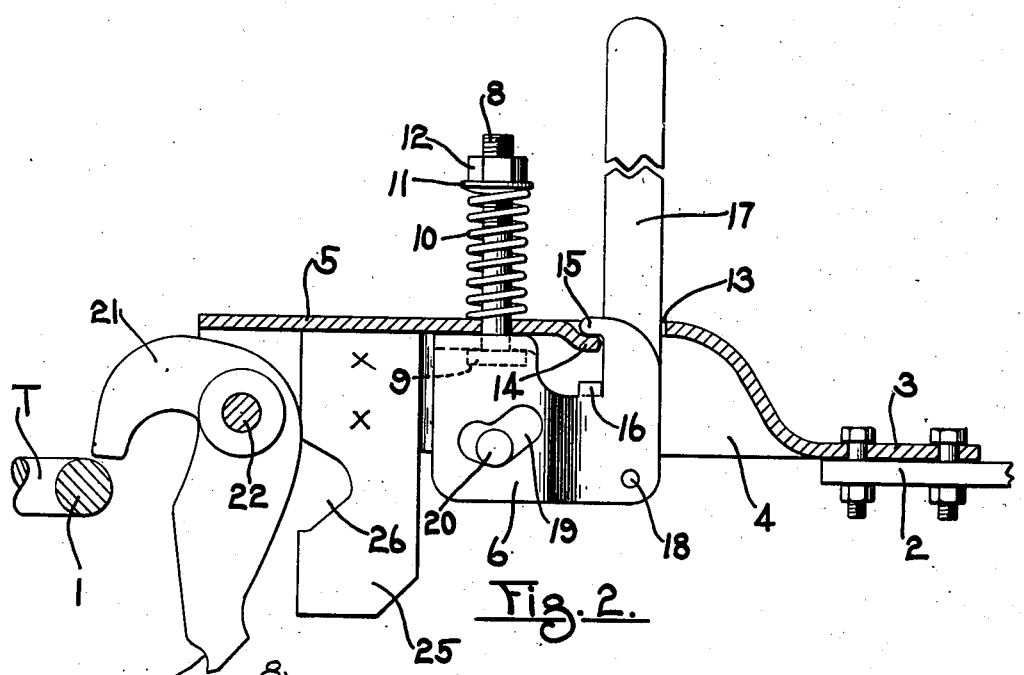
Fig. 2 is a longitudinal vertical section through the hitch taken on a different plane and showing the hook member in released position.

The pin 20 being freely movable in the slots 19, when it is desired to re-engage the hook with the clevis, a rearward movement of the clevis against the hook in its position as shown in Fig. 2 will move the tail-piece upwardly. The upper surface of the tail-piece is so shaped that it will contact the pin 20 and move it upwardly in one arm of the slot out of the path of movement thereof. After the end of the tail-piece has passed a predetermined point the pin 20 will then drop back to its normal position where the under side of the tail-piece will bear thereagainst and the various parts will be in a position as shown in Fig. 1. An arm 25 is provided and secured to one side of the housing which extends downwardly and has a recess 26 in its forward edge. The purpose of such recess being obviously to prevent the clevis from disengagement when no pull is being exerted and when there is a slack condition.

In certain instances it may be necessary to disengage the hook from the clevis manually, and when this is desired the lever 17 may be grasped and moved forwardly toward the tractor. This movement is illustrated in Fig. 7. In this movement the support rocks on the fulcrum 7a and the extensions 15 leave the lip 14. The rocking is sufficient to move the roller 20 from under the end of the tail-piece 23 so that it is completely released and permits the hook to rotate to the position shown in Fig. 2 and to release the clevis. The resistance to this rocking movement by the spring 10 is very slight because the fulcrum point 7a is closely adjacent the bolt 8. The pin 20, by movement of the support, will be moved out of the path of the tail-piece 23 whereupon the hook will rotate in a clockwise direction and disengage itself from the tractor clevis. A re-engagement of the parts may be accomplished either manually or as above described. It is to be remembered, however, that during disengagement due to abnormal load the support pivots about the points 14 and 15, while during manual disengagement the support pivots about the fulcrum point 7a.

Other modes of applying the principle of my invention may be used instead of the one here described, change being made as regards the structure herein disclosed provided, however, that the means stated by any of the following claims or the equivalent of such stated means be employed.

I claim:

1. A safety release hitch comprising, a clevis attached to a tractor, a housing attached to an implement, a hook pivotally mounted on said housing to hook over said clevis whereby the tractor may pull the implement, a member having spaced sides located within said housing, elongated slots in said sides, a pin extending between said sides and freely movable lengthwise of said slots, a tail-piece on said hook adapted to bear downwardly against said pin when the implement is pulled under normal load, and yieldable means for holding said member and pin against movement under normal load, but permitting movement thereof to free the clevis from the hook under abnormal load.

2. The combination of elements defined in claim 1, combined with a lever secured to said member to manually release said hook and clevis connection.

3. The combination of elements defined in claim 1, wherein said tail-piece at its upper side is so shaped as to act as a cam to move said pin out of the way when the hook is returned to clevis engaging position without moving the member on which said pin is mounted.

4. A safety release hitch comprising, a clevis attached to a tractor, a housing attached to an implement, a support pivotally mounted in said housing, a hook pivotally mounted in said housing and adapted to receive said clevis, a surface on said support inclined with relation to a line drawn between the pivot of said support and the pivot of said hook, a roller supported on said inclined surface, a tail-piece on said hook adapted to bear against said roller and yieldable means to normally hold said support with said roller in engagement with said tail-piece under normal load but permitting movement of said support and roller under abnormal load.

5. The elements in combination defined in claim 4 in which said surface is also inclined downwardly toward said hook with relation to the horizontal whereby gravity will move said roller on said surface toward said tail-piece.

6. A safety release hitch comprising, a housing, a hook adapted to receive a clevis and pivotally mounted on said housing, a tail-piece on said hook, a support, two spaced fulcrum points on said support both engaging said housing and on either of which said support can rock, spring means acting to hold said support in normal position relative to said housing, said spring means being located closer to one of said fulcrum points than the other and a stop on said support engaged by said tail-piece, rocking of said support on either of said fulcrums acting to move said stop away from said tail-piece.

7. The elements in combination defined in claim 6 combined with means for manually rocking said support on the fulcrum closest to said spring means.

8. The elements in combination defined in claim 6 in which said stop is movably mounted on said support and is moved by gravity into position under said tail-piece when the support is in normal position.

9. The elements in combination defined in claim 6 in which said tail-piece acts to rock said support on its fulcrum farthest from the spring means under resistance of said spring means.

10. A safety release hitch comprising, a clevis attached to a tractor, a housing attached to an implement, a hook pivotally mounted on said housing to hook over said clevis whereby the tractor may pull the implement, a support located within said housing and yieldably held in place and having spaced apart sides with elongated slots therein, and means mounted on said support to hold said hook in engagement with said clevis under normal load, said means including a pin extending between said sides and resting at its ends in said slots and freely movable therein, said pin being movable to reengage said hook with said clevis, said support and means thereon being movable under abnormal load to disengage the hook from the clevis.

11. A safety release hitch comprising, a clevis attached to a tractor, a housing attached to an implement, a hook pivotally mounted on said housing to hook over said clevis whereby the tractor may pull the implement, a support located within said housing and having spaced apart sides with elongated slots therein, alined openings in the top of said housing and said support, a rod extending upwardly through said opening having a head thereon at its lower end bearing against the under side of the support, a collar on said rod, a coiled compression spring between said collar and said housing to thereby yieldably hold said support against movement and means on said support to hold said hook in engagement with said clevis under normal load, said means including a pin having its ends mounted in said slots and freely movable therein, said pin adapted to be moved in said slots out of the path of said hook for reengagement of said hook with said clevis, said support and means thereon being movable under abnormal load against the force of said spring to disengage the hook from the clevis.

GERRIT DEN BESTEN.